No. 755,357.  Patented March 22, 1904.

UNITED STATES PATENT OFFICE.

ROBERT A. CHESEBROUGH, OF NEW YORK, N. Y.

COMPOSITION FOR LAYING DUST.

SPECIFICATION forming part of Letters Patent No. 755,357, dated March 22, 1904.

Application filed January 28, 1904. Serial No. 190,957. (No specimens.)

*To all whom it may concern:*

Be it known that I, ROBERT A. CHESEBROUGH, a citizen of the United States, and a resident of the borough of Manhattan, in the city and State of New York, have invented a new and useful Composition for Laying Dust, of which the following is a specification.

My invention comprises a composition for laying dust consisting of porous clay impregnated with petroleum or other oil.

The object of my invention is to provide a composition which may be applied to the surfaces of road-beds of all kinds for the purpose of laying the dust which tends to rise from traffic over said surface.

A further object of my invention is to provide a composition of the above character in which the oil will be retained in the composition for a long time, withstanding the tendency of rain to wash the oil out of the clay, and thereby off the surface of the road-bed. In common practice where the oil is sprinkled upon the road-bed it will be almost immediately washed off from the same by a heavy rain, the surface upon which the oil is applied being of such a nature as will permit the oil to wash down through the same rather than be impregnated therewith—as, for instance, the stone ballast of a railroad-bed.

My new composition is made up as follows: I provide a porous clay—such, for instance, as that commonly found in Florida or Georgia—which clay I impregnate with a certain proportion of petroleum or other oil. The proportion which I find to be very desirable is about twenty to twenty-five per cent. of petroleum or other oil.

When this composition is used upon railway road-beds, it should be sprinkled thinly over the same. In actual practice I have found that this covering of composition effectually lays the dust and retains its value for a long period in all kinds of weather; it being almost impossible for rain to wash the oil out of the porous clay.

When the composition is used on ordinary dirt roads and race-tracks, it should be evenly sprinkled over the surface of the road-bed and a road-roller passed over the same.

What I claim as my invention is—

1. A composition for laying dust consisting of porous clay impregnated with petroleum or other oil.

2. A composition for laying dust consisting of porous clay impregnated with petroleum or other oil in substantially the proportions specified.

In testimony that I claim the foregoing as my invention I have signed my name, in presence of two witnesses, this 23d day of January, 1904.

ROBERT A. CHESEBROUGH.

Witnesses:
 FREDK. HAYNES,
 HENRY THIEME.